United States Patent [19]
Orth et al.

[11] 4,067,543
[45] Jan. 10, 1978

[54] ELECTRICALLY OPERATED RETRACTABLE JACK

[76] Inventors: Joseph P. Orth; Gerald F. Schmidt, both of P.O. Box 11344, Wichita, Kans. 67211

[21] Appl. No.: 794,053

[22] Filed: May 5, 1977

[51] Int. Cl.² ............................................. B60S 9/02
[52] U.S. Cl. .................................................. 254/86 R
[58] Field of Search .............. 254/86 H, 86 R, 45, 254/7, 98; 280/764, 763; 285/3

[56] References Cited

U.S. PATENT DOCUMENTS

| | | | |
|---|---|---|---|
| 1,988,304 | 1/1935 | Duman | 254/86 R |
| 2,837,312 | 6/1958 | Troche | 254/86 H |
| 3,888,464 | 6/1975 | Felsen | 254/86 R |
| 3,962,737 | 6/1976 | James | 254/7 R |

FOREIGN PATENT DOCUMENTS

G17930 12/1956 Germany ........................ 254/86 R

Primary Examiner—Robert C. Watson
Attorney, Agent, or Firm—Ellsworth R. Roston; Edwin H. Crabtree; John H. Widdowson

[57] ABSTRACT

An electrically operated retractable jack for leveling a vehicle. The jack is automatically retractable from a vertical position into a horizontal stowage position under the vehicle. The jack may be operated individually or a plurality of jacks may be used in leveling the corners of a vehicle. The jacks may be raised and lowered by control switches mounted inside the vehicle without the need of the operator getting outside the vehicle.

15 Claims, 9 Drawing Figures

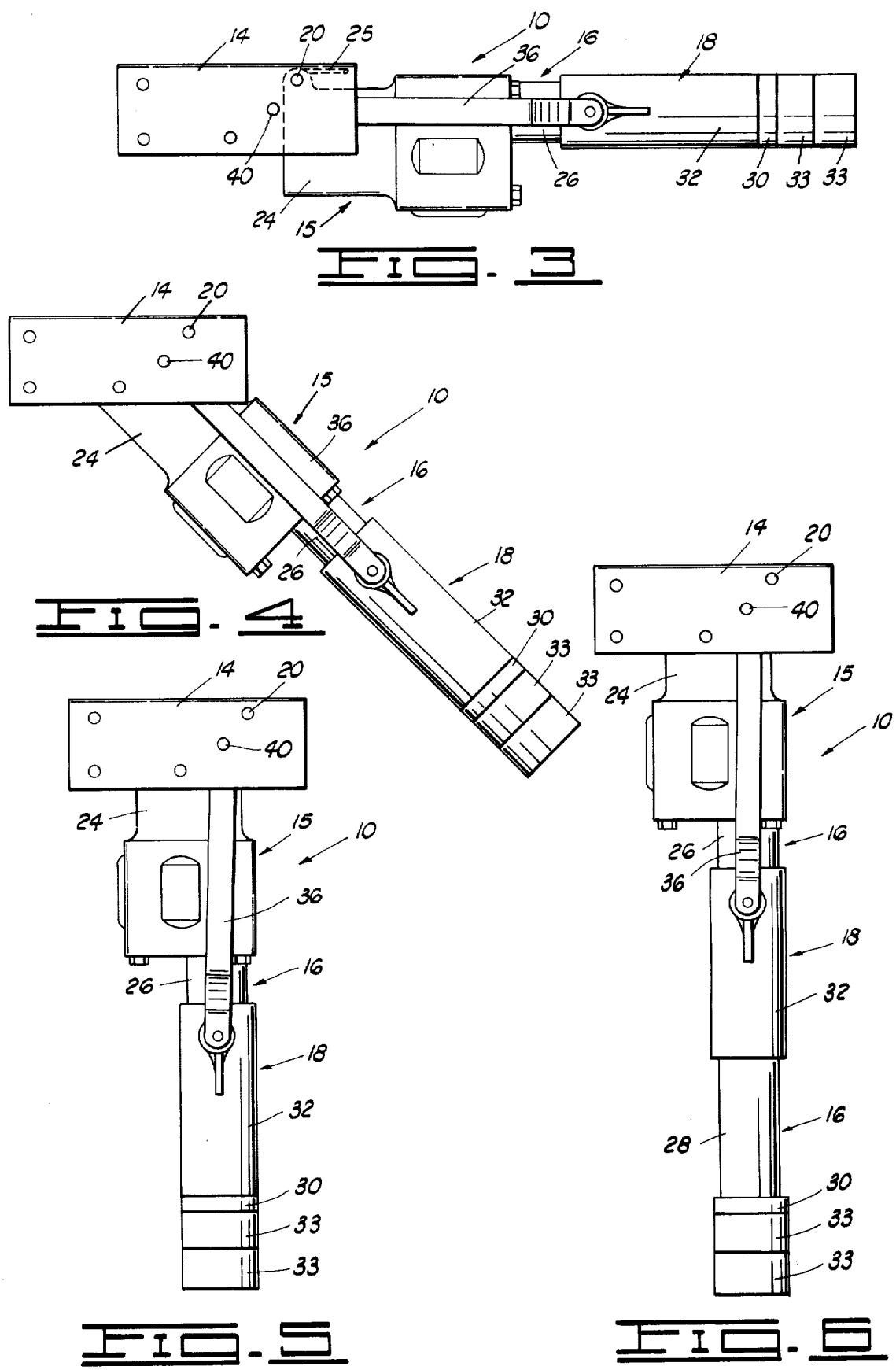

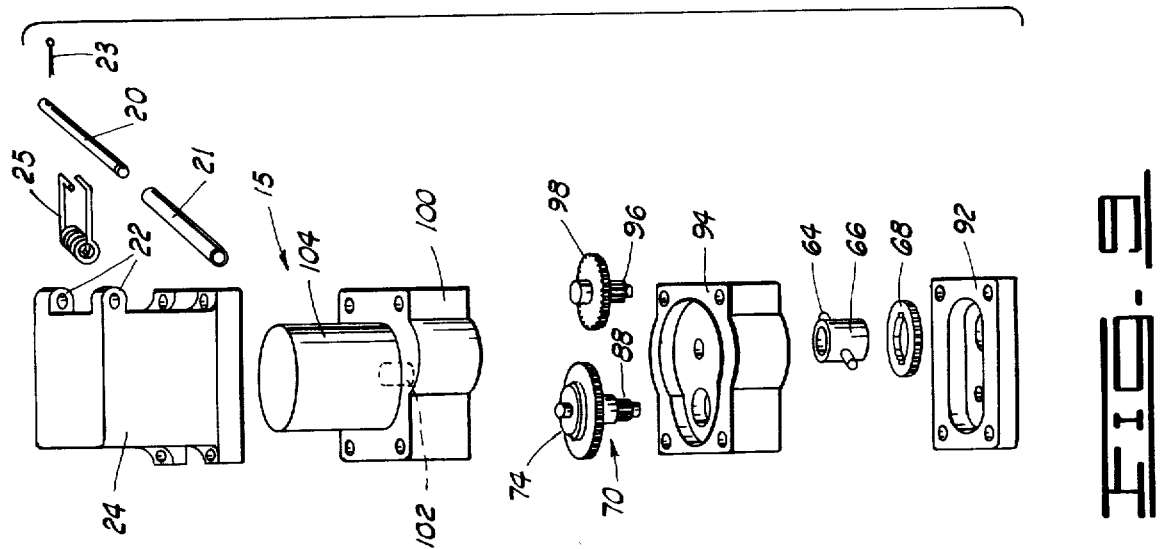
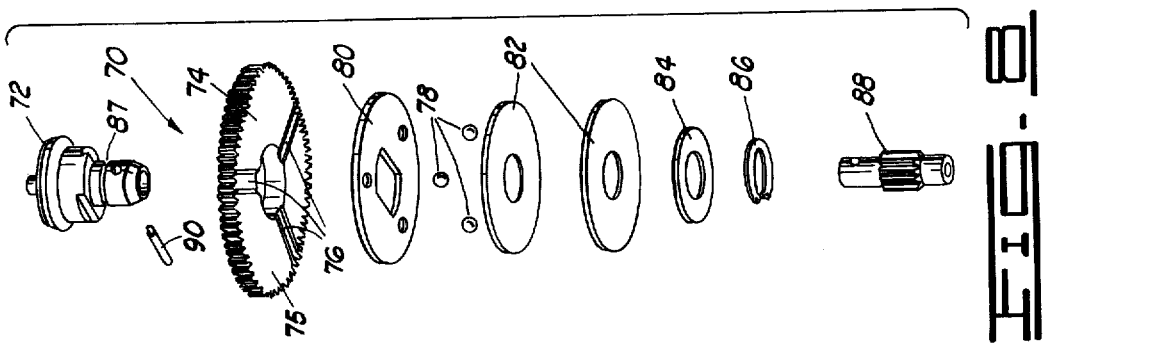
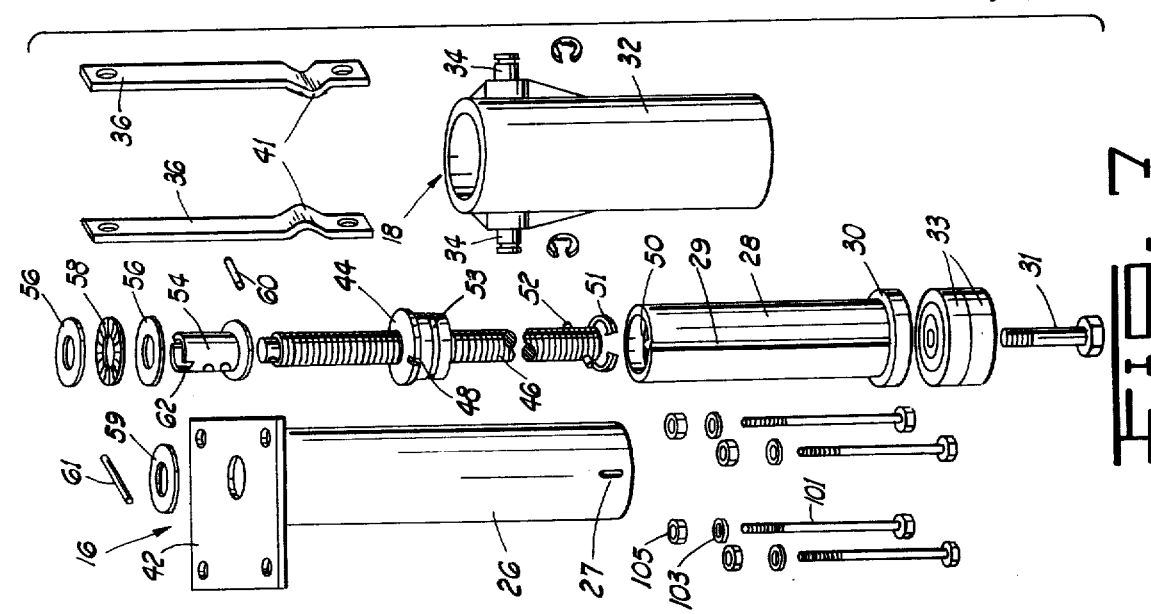

ELECTRICALLY OPERATED RETRACTABLE JACK

BACKGROUND OF THE INVENTION

This invention relates generally to jack assemblies for vehicles, and more particularly, but not by way of limitation, to an electrically operated retractable jack for mounting on a vehicle.

Heretofore, there have been a variety of electrical, hydraulic, and mechanical operated jacks used for leveling vehicles, trailers, or the like. Generally, the most common jacks are jacks mounted on the corners of a vehicle, or on the tongue of a trailer which raise and lower the vehicle and trailer is a vertical direction. These jacks have no provision for retracting the jack from a vertical position to a stowed horizontal position underneath the vehicle.

Also a common problem of a vehicle jack may have a sufficient initial torque to raise the vehicle to a level position, but after an extended period of time, the jack assembly locks up and the operator is unable to lower the vehicle. This problem is particular true when added weight is loaded on to the vehicle or a shift in position takes place subsequent to the leveling of the vehicle. An excess torque is therefore is therefore necessary to lower the vehicle.

There are prior art jacks which are retractable from a vertical position into a horizontal position, but these jacks are complex in design and construction and have been found to have limited commercial acceptance. The retractable jacks use offset pivot arms or a pivot cam for automatically pivoting the jacks into a horizontal position. None of the prior art jacks provide the simplicity, operation, advantages, and novel features of the subject invention as herein described.

SUMMARY OF THE INVENTION

The subject invention provides a jack which automatically retracts from a vertical position into a horizontal stowage position underneath the vehicle so that the vehicle is ready for travel. Also, the jack is automatically lowered from a horizontal position into a vertical position and in a position for extending the jack, leveling, and stablizing the vehicle.

The jack may be mounted in various arrangement combinations underneath a vehicle, such as on the four corners of the vehicle, the rear corners, and at the center of the front of the vehicle, or any other desired position. The jack also may be used for a tire change without having to use a hand-operated jack.

The jacks may be electrically wired to a control panel inside the vehicle so that the operator may level the vehicle without having to go outside. Each jack has its own individual electric motor drive unit, therefore should one fail the remaining jacks will operate independently for leveling the vehicle. The electric driven jacks provide the advantages over hydraulic and pneumatic jacks by eliminating fluid supply lines, valving, fluid leakage, and cold weather start up problems.

The invention provides a torque limiting clutch in combination with an electrical motor and gear drive that prevents the overloading of the motor and prevents the jack from locking up during both the raising and lowering of the jack. A greater amount of torque is provided to the jack by the limiting clutch when lowering the vehicle than for raising the vehicle.

The invention includes a mounting bracket attached to the bottom of the vehicle. A drive assembly including a motor housing, drive gear housing, and a clutch mounted therein is pivotally attached to the mounting bracket. Extending downwardly from the drive assembly and attached thereto is a ram assembly having a jack screw disposed inside an inner jack tube. The jack screw telescopes the inner jack tube outwardly from an outer jack tube. Disposed around the outer jack tube is a retraction sleeve. The sleeve is attached to retraction links which are attached to the mounting bracket. The pivot point of the links is offset from the pivot point of the drive assembly on the bracket whereby an eccentric load is placed on the retraction assembly when contacted by the ram assembly and the jack automatically pivots upwardly into a horizontal position when the load is maintained on the retraction assembly.

The advantages and objects of the invention will become evident from the following detailed description when read in conjunction with the accompanying drawings which illustrate the preferred embodiments of the invention.

BRIEF DESCRIPTION OF THE DRAWINGS

FIG. 3 is a side view of the jack in a horizontal retracted position.

FIG. 4 is a side view of the jack at an angle from the retracted position.

FIG. 5 is a side view of the jack in a lowered vertical position.

FIG. 6 is a side view of the jack in a vertical extended position.

FIG. 7 is a front view of the individual elements of the ram assembly.

FIG. 8 is a front view of the individual elements of the clutch assembly.

FIG. 9 is a front view of the individual elements of the drive assembly.

DETAILED DESCRIPTION OF THE DRAWINGS

Figure 1:
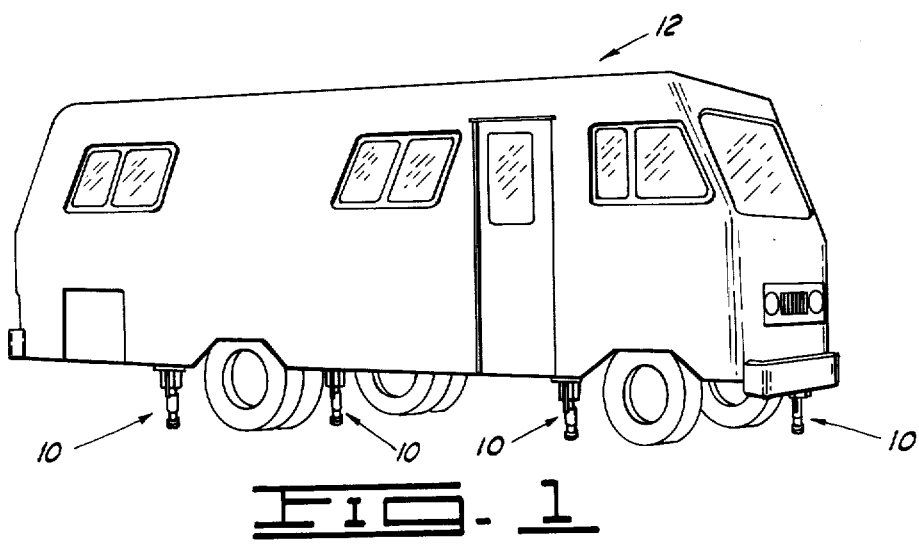
FIG. 1 is a perspective view of a recreational vehicle having the electrical retractable jack mounted on the four corners of the vehicle and on the center of the front bumper.

In FIG. 1, the electrical retractable jack is designated by general reference numeral 10. In this view, the jack 10 is seen mounted on the corners and the front bumper of a recreational vehicle 12. The jacks 10 may be mounted in various arrangement combinations on the vehicle 12 such as the four corners of the vehicle, the two rear corners and the center of the front of the vehicle, or any other desirable combination. The jacks 10 are electrically operated and may be wired to a control panel inside the vehicle 12. The jacks 10 may be powered by the vehicle's battery or any other alternate electrical power source. The operator of the jack 10 need not leave the inside of the vehicle when leveling the vehicle 12. The vehicle 12 is leveled and stabilized by rotating the jacks 10 into a vertical position, and extending the jack 10 onto the ground surface.

The system described herein has the advantage of providing remote, individual control of each jack assembly 10 with minute leveling and stabilization adjustments possible from a single location within the vehicle.

Appropriate leveling devices, such as bubble levels, may be positioned near the control panel so that the operator may observe them during the leveling operation. Also, the operator need not leave the vehicle 12 when retracting the jacks 10 from the ground surface and raising them into a retracted horizontal position under the vehicle 12 prior to travel.

Figure 2:
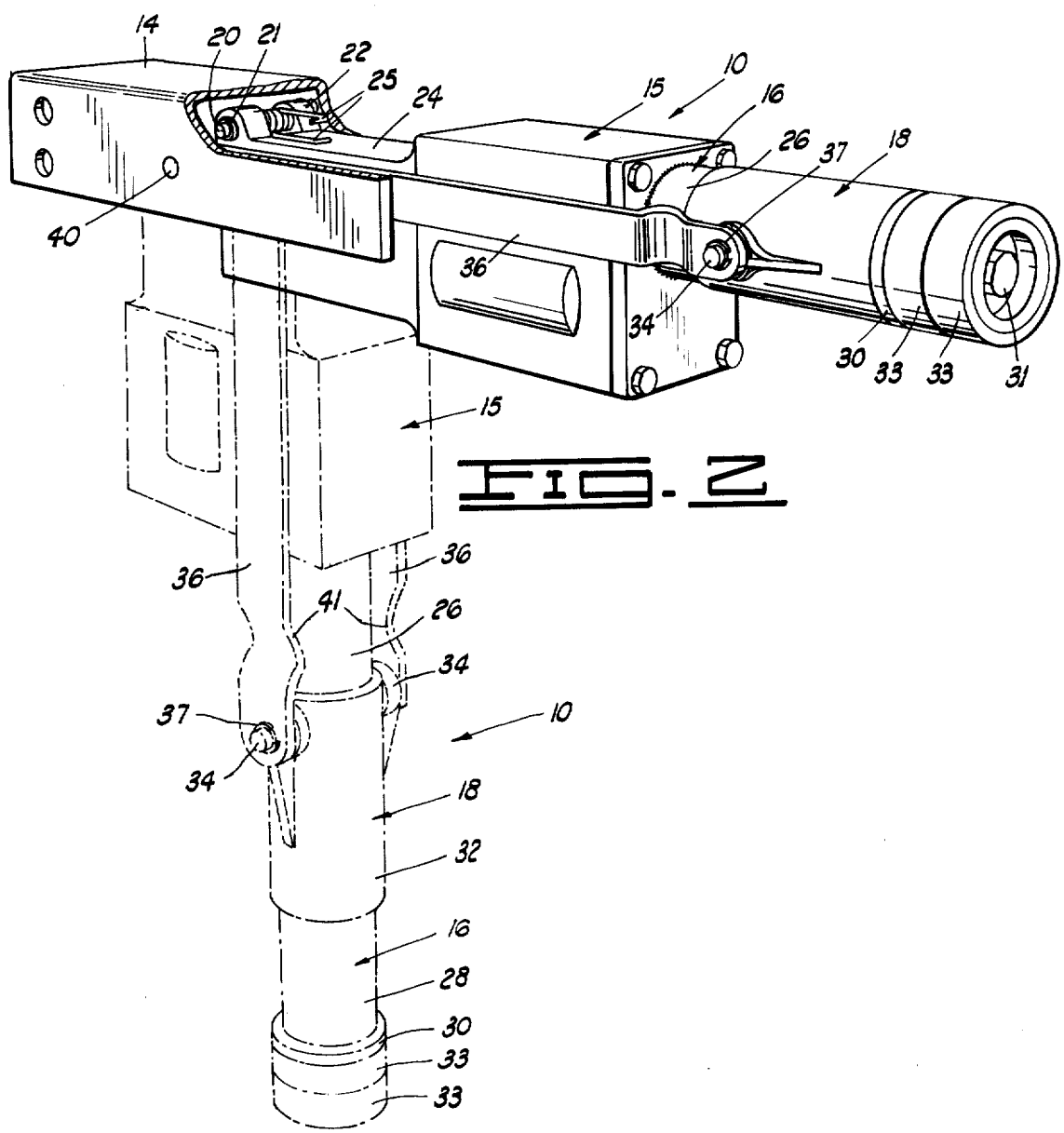
FIG. 2 is a perspective view of the jack in a retracted position and shown in dotted lines in an extended position.

FIG. 2 is a perspective view of the jack 10 and illustrates the jack 10 in a horizontal retracted position and in dotted lines in a vertical extended position.

Hydraulic and pneumatic systems are capable of providing as much lifting power and linear travel as conventional jack mechanical incline screw arrangements, depending upon piston and cylinder sizes and their operating pressures. Associated with hydraulic and pneumatic systems, however, are the disadvantages of lengthy and cumbersome supply lines to each individual unit, complex control and check valves, flexible coupling problems, cold weather operational difficulties, pipe flow losses and joint and seal leakage. For the invention described herein, all of these problems have been eliminated by the utilization of an electrically powered drive assembly 15 which not only provides a high torque level for the jack screw in the ram assembly 16, but also provides the power for retracting the jack 10 into the horizontal stowed position shown in FIG. 2.

The jack 10 includes a "U" shaped channeled mounting bracket 14, a drive assembly 15 pivotally attached to the bracket 14, a ram assembly 16 attached to the lower end of the drive assembly 15, and a retraction assembly 18 disposed around the ram assembly 16 and pivotally attached to the bracket 14.

The bracket 14 is shown having a cut away portion in one end thereof exposing a main pivot pin 20 which is attached to the sides of the bracket 14 and is received through pivot supports 22 intergrally formed in the sides of a motor housing 24. The motor housing 24 is part of the drive assembly 15. A torsion spring 25 is disposed between the pivot supports 22 and around the pin 20. The torsion spring 25 includes one end which is biased against the top of the bracket 14. The other end of the spring 25 is biased against the side of the motor housing 24. The jack 10 when lowered from the horizontal retracted position is biased downwardly and towards the vertical position by the weight of the jack 10 and the spring 25.

The drive asssembly 15 includes the motor housing 24, an electric motor, gearing, and a clutch assembly, which are discussed in detail under FIGS. 8 and 9. The lower end of the drive assembly 15 is secured to the top of the ram assembly 16.

The ram assembly 16 includes a hollow outer jack tube 26 with a hollow inner jack tube 28 slidably received therein. The lower end of the inner jack tube 28 includes a jack pad mounting plate 30, threaded to receive a bolt for attachment of an annular extension pad 33 as is required for the incremental adjustment of overall length to accomodate various vehicle heights above the ground surface. The underneath surface of the jack pad mounting plate 30, or extension pad 33 when used, provides a bearing surface against the ground when the vehicle is raised on the ground surface by the jack 10.

The retraction assembly 18 includes a hollow annular shaped retraction sleeve 32 with pivot inserts 34 integrally formed in the sides thereof and extending outwardly therefrom. The sleeve 32 is received around the outer and inner jack tubes 26 and 28. The retraction assembly 18 further includes a pair of elongated retraction links 36. The lower end of the retraction links 36 are pivotally attached to the pivot inserts 34. The upper end of the links 36 are pivotally attached to the mounting bracket 14 by a pin 40. The pin 40 is disposed below and to the left of the main pivot pin 20. By offsetting the position of the pin 40 with the pin 20 on the bracket 14, the retraction assembly 18 provides means for automatically pivoting the ram assembly 16 and drive assembly 15 upwardly to a horizontal stowage position in the bracket 14.

Each of the retraction links 36 includes a concave portion 41 along the length thereof for providing an area of weakness of both links 36 so that they would collapse or bend prior to overloading the internal components of the ram assembly 16 should the jack 10 be prevented from retracting into the bracket 14 by an obstruction.

A novel secondary feature of the retraction links 36 is the utilization of the concave portion 41 to provide an adjustment in overall linkage length. The length of both retraction links 36 between the pivot 40 and insert pivot 34 should be the same for proper performance of the retraction cycle. The design of the links 36 and the selections of material yield properties is such that the links bend with ease when overloaded, but maintain their lengths under normal operation. Any difference in length of the two links 36 is eventually reduced to a proper working length by the action of the retraction sleeve 32 applying a compressive end loading on the longest link 36 first. Thus, the linkage is self-adjusting under these circumstances.

In addition to the foregoing features, the length of the links 36 determines the amount of angular displacement the jack 10 undergoes during retraction into a stowed position. Lengthening the links 36 increases the rotational arc and shortening reduces the amount of angular arc. This is useful in the initial installation of the jack 10 on vehicles having obstructions or components in the area of attachment which might interfere with proper operation of the system. Lengthening of the links 36 is accomplished by partially flattening the concave portion 41.

In FIG. 3, the jack 10 is seen in a horizontal retracted position. In this position, the inner jack tube 28 has been retracted in the ram assembly 16 until the annular edge of the jack pad mounting plate 30 has come in contact with the bottom edge of the retraction sleeve 32. The compressive force of the inwardly moving inner jack tube 28 is distributed equally around the circumference of the retractable sleeve 32 by the jack pad mounting plate 30. This force in turn is distributed onto the retraction links 36 through the pivots 34 and because of the offset in the pivots 40 in bracket 14, the jack 10 is rotated upwardly in a counter clockwise direction. The jack 10 is held in place in the horizontal stowage position in the bracket 14 as long as the electric motor 104 is de-energized with the jack pad mounting plate 30 biased against the end of the retraction sleeve 32. Since sufficient friction is present in the gearing of the drive assembly 15 and the screw of the ram assembly 16, coupled with the magnetic braking action of the electric motor 104, the jack 10 is self-locking in whatever position it has attained when electrical power is discontinued. This has the particular advantage of eliminating complex mechanical locking devices to hold the jack 10 in the stowed position for travel or to prevent vehicle 12, which has been leveled and stabilized, from self-lowering.

The annular retraction sleeve 32, in combination with the retraction links 36 is advantageous in that it provides a more uniform application of force onto pivots 40 for retraction. The length of links 36 can be kept short such that thin, lightweight materials can be utilized for the links 36 without subjecting these parts to excessive column bending while under compressive loading. Since the load of the ram assembly 16 is distributed uniformly about the circumference of the annular sleeve 32, the use of thin-walled, lightweight tubing for the sleeve is also warranted.

In the stowed position, the sleeve 32 has the advantage of providing an external sheath for the ram assembly 16, further protecting the internal parts from mud, water, ice or other elements encountered during travel over roads or various kinds of terrain. During either extension or retraction, the sliding sleeve 32 also provides a wiping action which can remove caked mud and ice.

When the inner jack tube 28 is extended outwardly from the ram assembly 16, are force against the annular surface of the retraction sleeve 32 is relieved. The pivoted weight of the jack 10 and the spring 25 then urges the jack 10 downwardly into a vertical position shown in FIG. 5.

FIG. 4 illustrates the jack 10 at an angle from the vertical. This position is typical when the inner jack tube 28 is retracted inwardly into the outer jack tube 26, the jack pad mounting plate 30 contracting the retraction sleeve 32 and pivoting the jack 10 upwardly into a horizontal position, or in the reverse mode, the jack is pivoted downwardly into a vertical position.

In FIG. 5, the jack 10 is shown in a vertical position. The jack pad mounting plate 30 is no longer in contact with the end of the retraction sleeve 32. In this position, the top of the drive assembly 15 is adjacent the top of the mounting bracket 14 and the ram assembly 16 is in position for extending the inner jack tube 28 downward for leveling the vehicle 12.

In FIG. 6, the jack 10 is shown in a completely extended position with the inner jack tube 28 extended downwardly from the outer jack tube 26.

In FIG. 7, the individual parts of the ram assembly 16 and the retraction assembly 18 are illustrated. The ram assembly 16 includes the outer jack tube 26 having a mounting plate 42 with apertures therein for securing the tube 26 to the bottom of the drive assembly 15. The inner jack tube 28 which is slidably received inside the outer jack tube 26 is attached to a jack screwnut 44, which is threadably mounted on a jack screw 46. The nut 44 includes a keyway 48 which is inserted in an indent 50 in the top of the inner jack tube 28 for securing the nut 44 in a rotational direction. The nut 44 is secured longitudinally in the inner jack tube 28 by means of an annular locking ring 51 received by an annular grooving 53 in nut 44 and an annular groove inside the top of the inner jack tube 28. The jack screw 46 includes a stop pin 52 at the lower end thereof to prevent the nut 44 from coming loose from the screw 46.

The upper end of the jack screw 46 includes a drive collar 54 having a pair of washers 56 with a thrust bearing 58 having needle bearings mounted therebetween. The needle thrust bearing 58 and washers 56 are retained on the drive collar 54 and secured to the jack screw 46 by a retainer pin 60 inserted through an aperture in the drive collar 54 and an aperture in the upper end of the jack screw 46. The drive collar 64 is inserted through the tube 26, the aperture in mounting plate 42 and washer 59 upon final assembly of the ram assembly 16 and secured by retaining pin 61.

Although having slightly higher friction, the needle thrust bearing 58 has the advantage of having a considerably thinner profile and a higher thrust load capability than a convenional ball bearing thrust assembly occupying the same diameter. The combination of the mechanical screw jack 46, nut 44 and thrust bearing 58 with the other internal components provides a compact ram assembly 16 capable of lifting much greater loads than the prior art mechanical screw fixed jacks which have been available in the past. The limitations of space beneath a vehicle necessitates that most of the elements of a retractable system such as the jack 10 be as nearly compact as practical. Ground clearance must be maintained both during road travel and erection of the jack 10 to a vertical position prior to leveling and stabilizing the vehicle 12. Sufficient linear extension of the ram assembly must also be available to perform the leveling and stabilizing task. The physical arrangement and geometric characteristics of the jack 10 described herein fully meets all of these dimensional requirements.

The upper end of the drive collar 54 includes a slot 62 therein. The slot 62 is received around a jack pin 64 when securing the ram assembly 16 to drive assembly 15. The jack pin 64 is inserted through apertures in jack drive sleeve 66. The ends of the pin 64 are inserted into slots in a jack drive gear 68. The sleeve 66 is received inside the inner circumference of the gear 68 shown in FIG. 9. The gear 68, sleeve 66, and pin 64 assembly engage and rotate the drive collar 54 and jack screw 46 assembly shown in FIG. 7. The gear 68 is driven by a clutch assembly 70 described in the following paragraphs which relate to FIG. 8. Also seen in FIG. 7 is the annular retraction sleeve 32 and the retraction links 36.

Several distinct advanges are provided by the selection of the "in-line" arrangement of the motor housing 24, drive assembly 15 and the ram assembly 16 and the location of these components with respect to the main pivot 20 on bracket 14. One important advantage can be seen in FIG. 3 depicting the retracted or stowed position of the jack 10. The clearance provided beneath the jack 10 components and the ground or other obstacles is at a maximum, thus protecting the motor and other components from impact damage while the vehicle 12 is in motion.

Another advantage gained by the in-line arrangement with the electric motor located near the main pivot 20 is that much shorter electrical wiring leads can be used. These wires may be rotated out of the motor housing 24, through any convenient hole in the bracket 14 near the pivot 20 which permits unimpeded, free motion of the wires without damage during retraction or extension of the jack 10. While the vehicle 12 is in a traveling condition, the wiring is also protected from damage, being physically shielded by the motor housing 24 while jack 10 is retracted.

The proximity of the heavier motor housing 24 and drive assembly 15 to the main pivot 20 reduces the amount of power required to raise the pivoted portion of the jack to a horizontal retracted position. In addition, the dynamic loads produced as a result of vertical accelerations experienced by the horizontally stowed jack assembly 10 during road travel are reduced when the heavier components are grouped about the supporting main pivot 20. Since each suspended component produces a movement or torsional loading about the pivot 20 during vertical accelerations produced while the vehicle 12 is traveling and these forces must be reacted, it is advantageous to keep each component movement arm at a minimum as in the jack arrangement presented. Thus, fatigue life of the retraction links 36, pivot pins 34 and 40 and the retraction sleeve 32, which are already under a static compressive preload during the stowed condition, is greatly improved with the configuration used in the jack 10.

FIG. 8 illustrates the individual parts of the torque limiting clutch assembly 70. The assembly 70 provides means for differentially controlling the amount of torque applied to the jack screw 46 from the drive motor and gear train. Should the loads on the jack 10 become excessive while the ram assembly 16 is operating in either the retraction or leveling mode, the clutch assembly 70 will release at a preset torque level and the drive motor, gearing and ram assembly is prevented from being overloaded to the extent of damage.

The clutch assembly 70 includes a clutch gear shaft 72 for receiving the clutch gear 74 thereon. A lower face 75 of gear 74 includes three channeled valleys 76 therein. The valleys 76 are radially spaced in equal segments about the axis of rotation of the clutch gear 74. Each valley consists of a floor paralleling the face of the clutch gear 74 and at a designated depth with opposing sides beveled at two different inclinations relative to the face 75 of the gear 74.

A clutch drive plate 80 having apertures therein receive ball bearings 78 in the apertures. The ball bearings 78 are physically entrapped both radially and circumferentially within the perforated clutch drive plate 80 but possess translational freedom of motion in a direction perpendicular to the facing of the plate 80. The ball bearings 78 are biased directly by conically shaped disc springs 82 against the floor of the valleys 76, the valley slopes or on the gear facing 75 during operation. The springs 82 are retained against the ball bearings 78 by a spacer 84 and retaining ring 86. Th ring 86 is inserted into an annular groove 87 around the shaft 72. A jack drive pinion gear 88 is attached to the clutch gear shaft 72 by a pin 90.

When assembled, the disc springs 82 are pre-set to apply a designated load against the ball bearings 78. The disc springs 82 are in direct contact only with the ball bearings 78 during the phases of clutch operation. The clutch drive plate 80 serves as a floating member between the disc springs 82 and the clutch gear 74, transmitting only rotational loads from the clutch gear 74 to the clutch gear shaft 72 to which plate 80 is rotatably keyed.

In operation, the clutch gear 74 is driven by the reversible electric motor and gear assembly described in paragraphs which follow. During rotation of the clutch gear 74, the advancing incline of each of the valleys 76 bears against the lower portion of each ball 78 protruding through the drive plate 80, moving the balls upwardly and directly reacting the force produced by the disc springs 82. The loading of the disc springs 82 against each ball 78 increases with upward deflection. The pre-set biasing of the disc springs 82 thus determines the amount of force at which the balls 78 may move upwardly and over the edge of each incline and onto the facing 75 of the clutch gear 74. When the maximum torque theshold is reached, the ball bearings 78 exit and enter each successive valley 76, rolling freely on the facing 75 of the rotating clutch gear 74 and precluding further mechanical engagement between the gear 74 and the drive plate 80. Under this condition, the torque provided to the ram assembly 16 and hence the maximum load on the jack 10 is prevented from increasing above the designated limit. Torque is provided to the assembly 16 only when the balls are captured and retained in the valleys 76, mechanically engaging the clutch gear 74 and the drive plate 80.

The action described in the foregoing also applies while operating in a reverse rotational direction, however a differential torque limit is provided by the angular difference in the opposing inclines which bound the valleys 76.

In FIG. 9, the drive assembly 18 is illustrated. As discussed under FIG. 7, the jack drive gear 68, sleeve 66 and pin 64 engage the top of the drive collar 54. The above are housed inside a gear housing plate 92 which is threadably attached to a clutch gear housing 94. The gear teeth of the jack drive gear 68 mesh with the gear teeth of the jack drive pinion gear 88. The pinion gear 88 is received through the aperture in the top of the housing 92.

The clutch gear 72 is housed in the clutch gear housing 94 and drive gear housing 100 and is driven by a pinion gear 96 which is part of a motor drive gear 98. The upper portion of the drive gear 98 is received in a drive gear housing 100, which is threadably attached to the clutch gear housing 94 and the motor housing 24.

The drive gear 98 is driven by a motor drive shaft 102 of an electric motor 104. The motor 104 is housed and threadably attached to the motor housing 24 with the shaft 102 extending downwardly therefrom into the drive gear housing 100. Also seen in FIG. 9 is the coil spring 25 and pivot pin 20 which are received through apertures in the pivot supports 22 which are an integral part of the motor housing 24.

Changes may be made in the construction and arrangement of the parts or elements of the embodiments as disclosed herein without departing from the spirit of scope of the invention as defined in the following claims.

I claim:

1. A retractable jack for mounting on a vehicle and for supporting the vehicle on a ground plane, the jack comprising:

a mounting bracket attached to the vehicle;

an electric motor mounted in a housing, said housing pivotally attached to said bracket;

a clutch mounted in said housing, said clutch driven by said motor;

a jack screw threaded in a jack screw nut, one end of said jack screw attached to said clutch and driven thereby;

an inner jack tube slidably mounted inside an outer jack tube, said jack screw nut attached to said inner jack tube for telescoping said inner jack in said outer jack tube when said jack screw is rotated;

a jack pad attached to the lower end of said inner jack tube, said pad contacting the ground plane when said inner jack tube is extended;

an annular retraction sleeve disposed around said inner and outer jack tubes; and a pair of elongated retraction links pivotally attached to said retraction sleeve and pivotally attached to said bracket;

said jack pad contacting the lower portion of said retraction sleeve when said inner jack is retracted and said retraction sleeve and said retraction links pivoting the jack into a horizontal position on said bracket.

2. The jack as described in claim 1, wherein the pivot point of said retraction links on said bracket is offset from the pivot point of said housing on said bracket so that said retraction links and said retraction sleeve automatically pivot the jack into a horizontal position on said mounting bracket when said ram assembly is retracted.

3. The jack as described in claim 1, wherein said retraction links include a concave portion on the length thereof for providing an area of weakness in said links so that said links will collapse prior to overloading said motor should the jack fail to pivot on said bracket.

4. The jack as described in claim 1, further including a coil spring mounted on said housing and disposed against said bracket, said spring biasing the jack downward into a vertical position on said bracket.

5. A retractable jack for mounting on a vehicle and for supporting the vehicle on a ground plane, the jack comprising:
a mounting bracket attached to the vehicle;
an electric motor mounted in a housing, said housing pivotally attached to said bracket;
a clutch mounted in said housing, said clutch driven by said motor;
a jack screw threaded in a jack screw nut, one end of said jack screw attached to said clutch and driven thereby;
an inner jack tube slidably mounted inside an outer jack tube, said jack screw nut attached to said inner jack tube for telescoping said inner jack in said outer jack tube when said jack screw is rotated;
a jack pad attached to the lower end of said inner jack tube, said pad contacting the ground plane when said inner jack tube is extended;
an annular retraction sleeve disposed around said inner and outer jack tube; and
a pair of elongated retraction links pivotally attached to said retraction sleeve and pivotally attached to said bracket, the pivot point of said retraction links on said bracket offset from the pivot point of said housing on said bracket so that when said jack pad contacts the lower portion of said retraction sleeve an eccentric load is applied thereon and said retraction sleeve and said retraction links pivot the jack into a horizontal position on said bracket.

6. A retractable jack for mounting on a vehicle and for supporting the vehicle on a ground plane, the jack comprising:
a mounting bracket attachment to the vehicle;
a telescoping ram assembly operatively coupled at a first position to said mounting bracket in pivotable relationship to the bracket for pivotable movement between a retracted position under the vehicle and an extended position for supporting the vehicle on the ground plane, said telescoping ram assembly including a ball screw and a nut movable along the nut in accordance with the rotation of the screw and further including an electrical motor supported by the telescoping ram assembly at the end adjacent the attachment of said ram assembly to said mounting bracket and further including gears extending between the motor and the screw for rotating the screw in accordance with the operation of the motor;
linkage means attached at one end to said mounting bracket at a second position displaced from the first position for pivotal movement at the second position as a fulcrum and attached at the second end to said telescoping ram assembly for cooperating with said telescoping ram assembly to produce a pivotal movement of said telescoping ram assembly in accordance with the operation of the motor; and
support means operatively coupled to said telescoping ram assembly and responsive to the pivotable movement of said telescoping ram assembly to the extended position for movement to a position for supporting the vehicle on the ground plane in accordance with a further operation of said telescoping ram assembly.

7. The jack as described in claim 6, wherein said telescoping ram assembly includes an annular retraction sleeve disposed externally on said ram assembly in fixed position on said ram assembly and wherein said linkage means is attached at its second end to said annular sleeve to provide a distribution of the force from said linkage means around the annular periphery of said sleeve.

8. The jack as described in claim 7, wherein said linkage means includes a pair of links attached at their second end to said annular sleeve at opposite diametrical positions on said sleeve and wherein said links are provided with concave portions at intermediate positions along their lengths to provide a collapse of said links before said telescoping ram assembly becomes overloaded.

9. The jack as described in claim 6. Wherein said telescoping ram assembly includes a clutch constructed to provide slippage between the motor and the screw when the force imposed upon the screw exceeds a particular value, the clutch comprising:
a clutch drive plate having apertures spaced around its periphery;
a plurality of balls, each disposed in one of the apertures;
a drive member having channeled valleys in our surface for receiving the balls and for retaining the balls upon the imposition of forces on the clutch less than the particular value; and
spring means biasing the balls on a symmetrical basis for disposition in the valleys of the drive member.

10. The jack as described in claim 9, wherein means are provided for coupling the nut to said support means for driving said support means in accordance with the movement of the nut along the screw; and
said telescoping ram assembly includes an annular sleeve disposed externally on said ram assembly in fixed position on said ram assembly and wherein the linkage means are attached at their second ends to the annular sleeve to provide a distribution of the force from the linkage means around the annular periphery of the sleeve.

11. A retractable jack for mounting on a vehicle and for supporting the vehicle on a ground plane, the jack comprising:
a mounting bracket attachment to the vehicle;
a telescoping ram assembly mounted on said bracket at a first position for pivotal movement between a retracted position under the vehicle and a position extending toward the ground plane, said telescoping ram assembly including a rotatable screw and a nut and means including an inner jack tube holding the nut against rotation and providing for a movement of the nut along the screw in accordance with the rotation of the screw and including drive means for producing a rotation of the screw;

an annular sleeve disposed externally of the inner jack tube for receiving the jack tube for slidable movement within the sleeve;

a pair of links attached at first ends to the mounting bracket at a second position displaced from the first position for pivotable movement in accordance with the rotation of the screw and attached to the sleeve at second ends at opposite diametrical positions on the sleeve, the links being constructed to collapse upon an overloading of said telescope ram assembly above a particular value; and means attached to the inner jack tube for providing a support for the jack on the ground plane.

12. The jack as described in claim 11, wherein the drive means constitutes an electrical motor and wherein the motor is attached to said telescoping ram assembly at the upper end of said ram assembly.

13. The jack as described in claim 12, wherein a clutch is disposed relative to the drive means and the screw to provide for a coupling of the drive means to the screw for operative torques less than a particular value and to provide for a decoupling of the drive means from the screw for operative torques above the particular value, the clutch comprising a drive plate having a plurality of apertures annularly spaced around the plate;

a drive member having a surface with a plurality of valleys annularly spaced in a pattern corresponding to the pattern of the apertures in the drive plate;

a plurality of balls extending through the apertures into the valleys; and means for biasing the balls into the valleys to provide a coupling between the drive means and the screw.

14. The jack as described in claim 13, wherein the biasing means in the clutch include at least one disc spring disposed against the balls on the opposite side of the drive plate from the drive member and wherein the valleys in the drive member are bevelled at a particular angle to control the particular value of the torque at which the drive means will become decoupled from the screw.

15. The jack as described in claim 14, wherein the valleys are bevelled at their annularly peripheral ends and wherein the bevels at the first annularly peripheral ends of the valleys are disposed at a first angle and the bevels at the opposite annularly peripheral ends are disposed at a second angle different from the first angle to control the torques at which the clutch starts to slip when rotated in opposite directions.

* * * * *